(12) United States Patent
Yonezawa et al.

(10) Patent No.: US 9,658,245 B2
(45) Date of Patent: May 23, 2017

(54) IMPACT DETECTION CIRCUIT FOR PHYSICAL QUANTITY DETECTION DEVICE TO DETECT IMPACT TO ELECTRONIC APPARATUS, MOVING OBJECT, AND IMPACT DETECTION METHOD

(71) Applicant: Seiko Epson Corporation, Tokyo (JP)

(72) Inventors: Takemi Yonezawa, Minowa (JP); Tetsuhiro Yamada, Chino (JP)

(73) Assignee: Seiko Epson Corporation (JP)

( * ) Notice: Subject to any disclaimer, the term of this patent is extended or adjusted under 35 U.S.C. 154(b) by 135 days.

(21) Appl. No.: 14/660,160

(22) Filed: Mar. 17, 2015

(65) Prior Publication Data

US 2015/0268265 A1    Sep. 24, 2015

(30) Foreign Application Priority Data

Mar. 19, 2014   (JP) ................. 2014-056359

(51) Int. Cl.
*G01P 15/18*   (2013.01)
*G01P 15/08*   (2006.01)
*G01P 15/03*   (2006.01)

(52) U.S. Cl.
CPC ............ *G01P 15/18* (2013.01); *G01P 15/036* (2013.01); *G01P 15/0891* (2013.01)

(58) Field of Classification Search
CPC .................................................. G01P 15/0891
USPC ......................................... 73/514.35, 12.04
See application file for complete search history.

(56) References Cited

U.S. PATENT DOCUMENTS

| 6,889,128 B2 * | 5/2005 | DeBoni .............. B60G 17/0195 701/36 |
| 7,930,921 B2 * | 4/2011 | Obori ...................... A63F 13/06 73/12.04 |
| 8,326,569 B2 | 12/2012 | Lee et al. |
| 2010/0045624 A1 | 2/2010 | Hisatsugu et al. |

FOREIGN PATENT DOCUMENTS

| JP | 2010-080219 A | 4/2010 |
| JP | 2010-112874 A | 5/2010 |
| JP | 2012-063950 A | 3/2012 |
| JP | 2012-522324 A | 9/2012 |
| WO | WO-2010-114841 A1 | 10/2010 |

* cited by examiner

*Primary Examiner* — John Chapman, Jr.
(74) *Attorney, Agent, or Firm* — Harness, Dickey & Pierce, P.L.C.

(57) ABSTRACT

An impact detection circuit includes a first detection section adapted to detect presence or absence of an impact input based on a first output signal as an output signal in a first detection axis of an inertial sensor having the first detection axis and a second detection axis different from each other, a second detection section adapted to detect presence or absence of an impact input based on a second output signal as an output signal in the second detection axis, and an impact detection determination section adapted to determine that an impact input has been made in a case in which both of the first detection section and the second detection section have detected the presence of the impact input.

16 Claims, 7 Drawing Sheets

IMPACT DETECTION CIRCUIT FOR PHYSICAL QUANTITY DETECTION DEVICE TO DETECT IMPACT TO ELECTRONIC APPARATUS, MOVING OBJECT, AND IMPACT DETECTION METHOD

BACKGROUND

1. Technical Field

The present invention relates to an impact detection circuit, a physical quantity detection device, an electronic apparatus, a moving object, and an impact detection method.

2. Related Art

For example, there have been developed electronic apparatuses receiving an impact such as a tapping action (an action of tapping with a finger or the like) or a vibration as an input. Due to the above, there have been proposed a variety of methods for detecting such an impact input.

In JP-T-2012-522324 (Document 1), there is disclosed a tapping direction detection algorithm in which it is determined that a tap input has been made in the case in which a sum of the absolute values of the differential values of the acceleration values detected with respect to three axes exceeds a threshold value.

In U.S. Pat. No. 8,326,569 (Document 2), there is disclosed a tapping detection method in which it is determined that a tap input has been made in the case in which either of the differential values of the acceleration values along the three axes exceeds a threshold value.

However, in both of the methods described in Document 1 and Document 2, there is a possibility that false detection occurs in impact input in multiple axes (two or more axes). For example, in the purpose of the tap input detection, there is a possibility that it is determined that the tap input has been made even in the case of the impact other than the tap input (e.g., in the case in which an electronic apparatus is put rather violently on a desk).

SUMMARY

An advantage of some aspects of the invention is to provide an impact detection circuit, a physical quantity detection device, an electronic apparatus, a moving object, and an impact detection method capable of improving the accuracy of the impact detection in the impact input in multiple axes.

The invention can be implemented as the following aspects or application examples.

Application Example 1

An impact detection circuit according to this application example includes a first detection section adapted to detect presence or absence of an impact input based on a first output signal as an output signal in a first detection axis of an inertial sensor having the first detection axis and a second detection axis different from each other, a second detection section adapted to detect presence or absence of an impact input based on a second output signal as an output signal in the second detection axis, and an impact detection determination section adapted to determine that an impact input has been made in a case in which both of the first detection section and the second detection section have detected the presence of the impact input.

It is extremely unusual for the impact input to appear only in the output of one detection axis, and the impact input usually appears in the outputs of two or more detection axes. According to this application example, since it is determined that an impact input has been made in the case in which both of the first detection section and the second detection section have detected the impact input, it is possible to reduce the false detection due to an input of an impact only in one detection axis. Therefore, it is possible to realize the impact detection circuit capable of improving the accuracy of the detection of an impact in two or more axes.

Application Example 2

The impact detection circuit according to the application example described above may be configured such that the first detection section detects the presence of the impact input in a case in which the first output signal has exceeded a first reference value and then fallen below the first reference value in either of a positive direction and a negative direction of the first detection axis, and the second detection section detects the presence of the impact input in a case in which the second output signal has exceeded a second reference value and then fallen below the second reference value in either of a positive direction and a negative direction of the second detection axis.

According to this application example, since it becomes easy to exclude the action other than the impact input such as a mere transfer of the device, the accuracy of the impact detection can be improved. Further, since it is sufficient to detect the impact input in either of the positive direction and the negative direction, prompt impact detection can be performed.

Application Example 3

The impact detection circuit according to the application example described above may be configured such that the first reference value and the second reference value can be set independently of each other.

According to this configuration, it is possible to arbitrarily set the detection direction of an impact input with respect to the directions of the detection axes.

Application Example 4

The impact detection circuit according to the application example described above may be configured such that the first detection section detects the presence of the impact input in a case in which the first output signal has exceeded a first reference value and then fallen below the first reference value in both of a positive direction and a negative direction of the first detection axis, and the second detection section detects the presence of the impact input in a case in which the second output signal has exceeded a second reference value and then fallen below the second reference value in both of a positive direction and a negative direction of the second detection axis.

In the input of an impact, it is usual for the first output signal or the second output signal to exceed the reference value in both of the positive direction and the negative direction of the detection axis. Therefore, according to this application example, the accuracy of the detection of the impact in two or more axes can be improved.

Application Example 5

The impact detection circuit according to the application example described above may be configured such that there is adopted a configuration in which the first reference value and the second reference value can be set independently of each other.

According to this configuration, it is possible to arbitrarily set the detection direction of an impact input with respect to the directions of the detection axes.

Application Example 6

The impact detection circuit according to the application example described above may be configured such that the impact detection determination section determines that the impact input has been made in a case in which both of the first detection section and the second detection section have detected the presence of the impact input within a detection period.

It is usual for a single impact input to appear in a plurality of detection axes within a certain period of time. According to this application example, since it is determined that an impact input has been made in the case in which both of the first detection section and the second detection section have detected the presence of the impact input within the detection period, it is possible to realize the impact detection circuit capable of improving the accuracy of the impact detection.

Application Example 7

The impact detection circuit according to the application example described above may be configured such that the detection period starts at a timing at which one of the first output signal and the second output signal has exceeded the respective reference values.

Thus, the impact detection determination section can appropriately determine the presence or absence of an impact input no matter which one of the first detection section and the second detection section has first detected the presence of the impact input.

Application Example 8

The impact detection circuit according to the application example described above may be configured such that the first detection section and the second detection section detect presence or absence of the impact input based on the first output signal or the second output signal on which a high-pass filter processing has been performed.

According to this application example, since it becomes easy to remove a low frequency component (e.g., the gravitational acceleration and an arm-swinging motion) other than an impact input, the accuracy of the detection of an impact in two or more axes can be improved.

Application Example 9

A physical quantity detection device according to this application example includes any one of the impact detection circuits according to the application examples described above, and the inertial sensor.

Application Example 10

An electronic apparatus according to this application example includes any one of the impact detection circuits according to the application examples described above.

Application Example 11

A moving object according to this application example includes any one of the impact detection circuits according to the application examples described above.

Since the physical quantity detection device, the electronic apparatus, and the moving object each include the impact detection circuit capable of improving the accuracy of the impact detection, it is possible to realize the physical quantity detection device, the electronic apparatus, and the moving object suitable for the detection of an impact input or the operation using an impact input.

Application Example 12

An impact detection method according to this application example includes a first detection step of detecting presence or absence of an impact input based on a first output signal of an inertial sensor having a plurality of detection axes, a second detection step of detecting presence or absence of an impact input based on a second output signal different in the detection axis from the first output signal of the inertial sensor, and an impact detection determination step of determining that an impact input has been made in a case in which the presence of the impact input has been detected in both of the first and second detection steps.

It is extremely unusual for the impact input to appear only in the output of one detection axis, and the impact input usually appears in the outputs of two or more detection axes. According to this application example, since it is determined that an impact input has been made in the case in which the impact input has been detected in both of the first and second detection steps, it is possible to reduce the false detection due to an input of an impact only in one detection axis. Therefore, it is possible to realize the impact detection method capable of improving the accuracy of the detection of an impact in two or more axes.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some preferred embodiments of the invention will be described in detail using the accompanying drawings. The drawings used herein are for the sake of convenience of explanation. It should be noted that the embodiments described below do not unreasonably limit the content of the invention as set forth in the appended claims. Further, all of the constituents described below are not necessarily essential elements of the invention.

In the following explanation, an impact input corresponds to an action (a so-called tap input) of tapping a specific apparatus once with an input device such as a part of a human body or a stylus pen. Further, the tap input is one of phenomena including an impact in two or more axes. As the physical quantity of the impact, there can be cited acceleration, angular velocity, pressure, magnetic force, and so on.

1. First Embodiment

1-1. Impact Detection Circuit and Physical Quantity Detection Device

Figure 1:
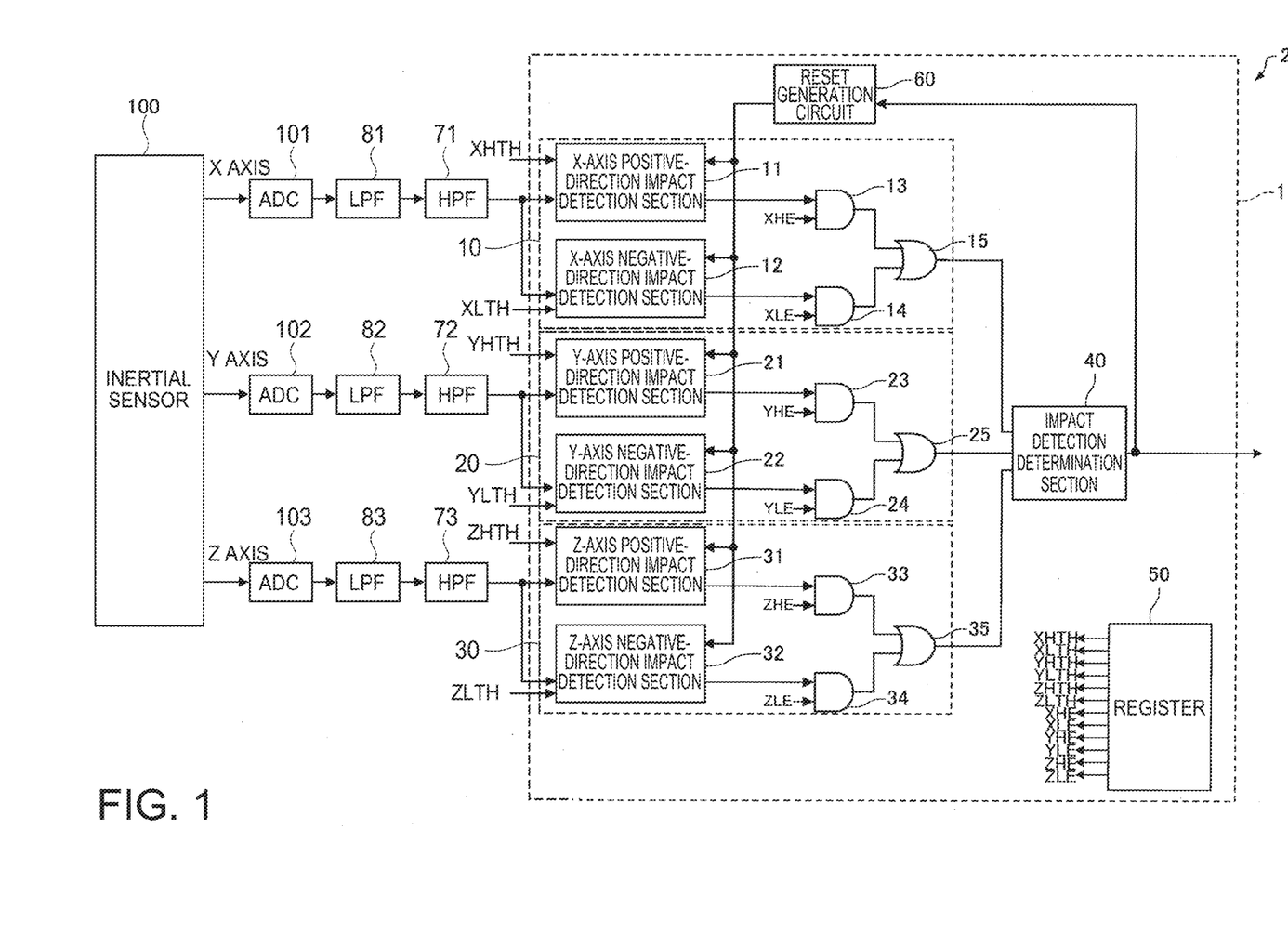
FIG. 1 is a circuit diagram showing a configuration of a physical quantity detection device 200 according to a first embodiment of the invention.

FIG. 1 is a circuit diagram showing a configuration of a physical quantity detection device 200 according to the present embodiment.

The physical quantity detection device 200 according to the present embodiment is configured including an impact detection circuit 1 and an inertial sensor 100. The impact detection circuit 1 can also be formed of, for example, a semiconductor circuit. At least a part of the blocks shown in FIG. 1 can also be realized by a program executed by a central processing unit (CPU) not shown.

The impact detection circuit 1 according to the present embodiment is configured including a first detection section 10 for detecting the presence or absence of an impact input based on a first output signal of the inertial sensor 100 having a plurality of detection axes, a second detection section 20 for detecting the presence or absence of an impact input based on a second output signal different in detection axis from the first output signal of the inertial sensor 100, and an impact detection determination section 40, which determines that an impact input has been made in the case in which both of the first detection section 10 and the second detection section 20 have detected the impact input.

The inertial sensor 100 is a sensor for detecting a physical quantity, a physical phenomenon (e.g., acceleration, a tilt angle, an impact, a vibration, and a rotation), and so on using inertia. As the inertial sensor 100, an acceleration sensor and an angular velocity sensor, for example, can be adopted. In the present embodiment, the inertial sensor 100 is formed of an acceleration sensor having the detection axes in the three directions (the X-axis direction, the Y-axis direction, and the Z-axis direction perpendicular to each other).

The output signal in the X-axis direction of the inertial sensor 100 is input to the first detection section 10 via an A/D converter 101, a low-pass filter 81, and a high-pass filter 71. The output signal in the Y-axis direction of the inertial sensor 100 is input to the second detection section 20 via an A/D converter 102, a low-pass filter 82, and a high-pass filter 72. The output signal in the Z-axis direction of the inertial sensor 100 is input to a third detection section 30 via an A/D converter 103, a low-pass filter 83, and a high-pass filter 73.

The first detection section 10 detects the presence or absence of an impact input based on the first output signal (the output signal in the X-axis direction) of the inertial sensor 100. The second detection section 20 detects the presence or absence of an impact input based on the second output signal (the output signal in the Y-axis direction) of the inertial sensor 100. The third detection section 30 detects the presence or absence of an impact input based on the third output signal (the output signal in the Z-axis direction) of the inertial sensor 100. It should be noted that the correspondence relationship between the first detection section 10, the second detection section 20, and the third detection section 30 and the detection axes of the inertial sensor 100 is illustrative only, and arbitrary combinations can be adopted. Further, hereinafter, an example of determining whether or not the tap input has been made using the X axis and the Y axis among the detection axes will mainly be explained.

It is also possible for each of the first detection section 10, the second detection section 20, and the third detection section 30 to detect the presence of an impact input in the case in which the first output signal, the second output signal, or the third output signal has exceeded a reference value and then fallen below the reference value in either of the positive direction and the negative direction of the detection axis.

By adopting such a configuration, it becomes easy to exclude the action other than the impact input such as a mere transfer of the device, and therefore, the accuracy of the impact detection can be improved. Further, since it is sufficient to detect an impact input in either of the positive direction and the negative direction in each of the detection axes, prompt impact detection can be performed.

Since the first detection section 10, the second detection section 20, and the third detection section 30 have substantially the same configuration, the configuration of the first detection section 10 will hereinafter be explained, and the configurations of the second detection section 20 and the third detection section 30 will be described in parentheses.

The first detection section 10 (the second detection section 20, the third detection section 30) is configured including an X-axis positive-direction impact detection section 11 (a Y-axis positive-direction impact detection section 21, a Z-axis positive-direction impact detection section 31) for detecting the presence or absence of an impact input in the positive direction of the detection axis, and an X-axis negative-direction impact detection section 12 (a Y-axis negative-direction impact detection section 22, a Z-axis negative-direction impact detection section 32) for detecting the presence or absence of an impact input in the negative direction of the detection axis. The X-axis positive-direction impact detection section 11 (the Y-axis positive-direction impact detection section 21, the Z-axis positive-direction impact detection section 31) and the X-axis negative-direction impact detection section 12 (the Y-axis negative-direction impact detection section 22, the Z-axis negative-direction impact detection section 32) each output a high level in the case in which the impact input has been detected, and output a low level in the case in which no impact input has been detected.

An AND circuit 13 (an AND circuit 23, and an AND circuit 33) calculates the logical product (AND) of the output signal of the X-axis positive-direction impact detection section 11 (the Y-axis positive-direction impact detection section 21, the Z-axis positive-direction impact detection section 31) and an enable signal XHE (an enable signal YHE, an enable signal ZHE). An AND circuit 14 (an AND circuit 24, and an AND circuit 34) calculates the logical product (AND) of the output signal of the X-axis negative-direction impact detection section 12 (the Y-axis negative-direction impact detection section 22, the Z-axis negative-direction impact detection section 32) and an enable signal XLE (an enable signal YLE, an enable signal ZLE). For example, in the case of determining whether or not the tap input has been made using the X axis and the Y axis among the detection axes, the enable signal ZHE and the enable signal ZLE are in the high level, and the enable signal XHE, the enable signal XLE, the enable signal YHE, and the enable signal YLE are in the low level.

An OR circuit 15 (an OR circuit 25, an OR circuit 35) calculates a logical sum (OR) of the output signal of the AND circuit 13 (the AND circuit 23, the AND circuit 33) and the output signal of the AND circuit 14 (the AND circuit 24, the AND circuit 34). The output signal of the OR circuit 15 (the OR circuit 25, the OR circuit 35) is input to the impact detection determination section 40.

The impact detection determination section 40 determines that an impact input has been made in the case in which both of the first detection section 10 and the second detection section 20 have detected the impact input. The impact detection determination section 40 can also be configured including, for example, an AND circuit for calculating a logical product of the output signals of the OR circuit 15, the OR circuit 25, and the OR circuit 35.

It is extremely unusual for an impact input to appear only in the output of one detection axis, but the impact input usually appears in the outputs of two or more detection axes. According to the impact detection circuit 1 related to the present embodiment, since it is determined that an impact input has been made in the case in which both of the first detection section 10 and the second detection section 20 have detected the impact input, it is possible to reduce the false detection due to an input of an impact only in one detection axis. Therefore, it is possible to realize the impact detection circuit 1 capable of improving the accuracy of the detection of an impact in two or more axes.

The impact detection determination section 40 can also determine that an impact input has been made in the case in which both of the first detection section 10 and the second detection section 20 have detected the presence of the impact input within a detection period.

It is usual for a single impact input to appear in the outputs of a plurality of detection axes within a certain period of time. According to the impact detection circuit 1 related to the present embodiment, since it is determined that an impact input has been made in the case in which both of the first detection section 10 and the second detection section 20 have detected the presence of the impact input within the detection period, it is possible to realize the impact detection circuit 1 capable of improving the accuracy of the impact detection.

In this case, the detection period can start at the timing at which one of the first output signal and the second output signal has exceeded the reference value.

Thus, the impact detection determination section 40 can appropriately determine the presence or absence of an impact input no matter which one of the first detection section 10 and the second detection section 20 has first detected the presence of the impact input.

The impact detection circuit 1 can also be configured so as to be able to set the reference value of the first detection section 10, the reference value of the second detection section 20, and the reference value of the third detection section 30 independently of each other. In the present embodiment, the impact detection circuit 1 is configured including a register 50. The register 50 outputs a reference value signal XHTH for setting the reference value of the X-axis positive-direction impact detection section 11, a reference value signal XLTH for setting the reference value of the X-axis negative-direction impact detection section 12, a reference value signal YHTH for setting the reference value of the Y-axis positive-direction impact detection section 21, a reference value signal YLTH for setting the reference value of the Y-axis negative-direction impact detection section 22, a reference value signal ZHTH for setting the reference value of the Z-axis positive-direction impact detection section 31, and a reference value signal ZLTH for setting the reference value of the Z-axis negative-direction impact detection section 32. Further, the register 50 may also output the enable signal XHE, the enable signal XLE, the enable signal YHE, the enable signal YLE, the enable signal ZHE, and the enable signal ZLE.

By adopting such a configuration, it is possible to arbitrarily set the detection direction of an impact input with respect to the directions of the detection axes.

The impact detection circuit 1 may also be configured including a reset generation circuit 60 for generating a reset signal for resetting actions of the first detection section 10, the second detection section 20, and the third detection section 30 based on the output signal of the impact detection determination section 40. In the example shown in FIG. 1, the reset generation circuit 60 outputs the reset signal to the X-axis positive-direction impact detection section 11, the X-axis negative-direction impact detection section 12, the Y-axis positive-direction impact detection section 21, the Y-axis negative-direction impact detection section 22, the Z-axis positive-direction impact detection section 31, and the Z-axis negative-direction impact detection section 32.

In the impact detection circuit 1 according to the present embodiment, it is also possible for the first detection section 10, the second detection section 20, and the third detection section 30 to detect the presence or absence of an impact input based on the first output signal, the second output signal, or the third output signal on which a high-pass filter processing has been performed. In the example shown in FIG. 1, the high-pass filter processing is performed on the first output signal by the high-pass filter 71, the high-pass filter processing is performed on the second output signal by the high-pass filter 72, and the high-pass filter processing is performed on the third output signal by the high-pass filter 73.

By adopting such a configuration, since it becomes easy to remove a low frequency component (e.g., the gravitational acceleration and an arm-swinging motion) other than an impact input, the accuracy of the detection of an impact in two or more axes can be improved.

It is also possible for the physical quantity detection device 200 according to the present embodiment to output, for example, the output signal of the high-pass filter 71, the output signal of the high-pass filter 72, and the output signal of the high-pass filter 73 to the outside. In the present embodiment, the acceleration is measured as a physical quantity, and these output signals correspond to measurement data of the acceleration by the inertial sensor 100.

Since the physical quantity detection device 200 according to the present embodiment includes the impact detection circuit 1 capable of improving the accuracy of the impact detection, it is possible to realize the physical quantity detection device 200 suitable for the detection of an impact input or the operation using an impact input.

1-2. Impact Detection Method

Figure 2:
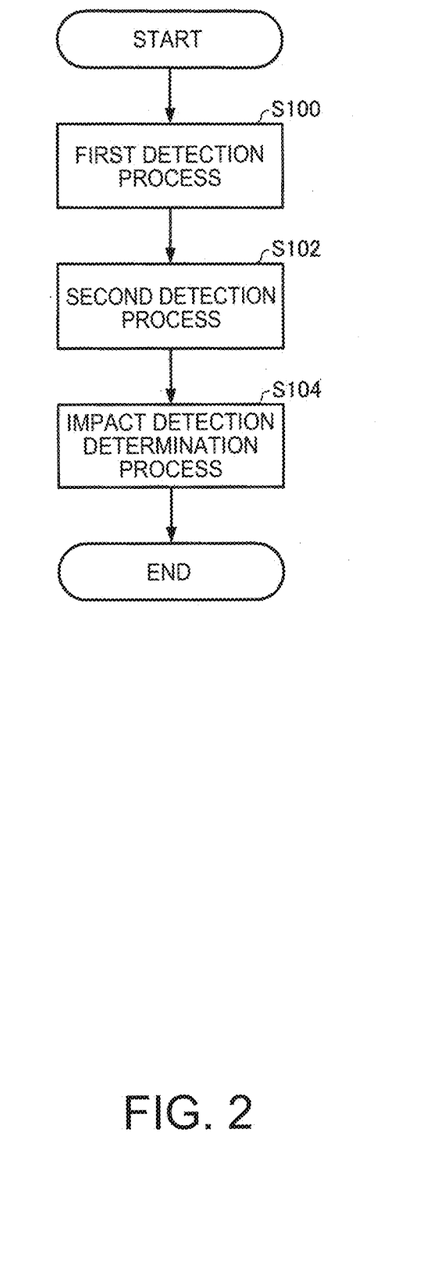
FIG. 2 is a flowchart showing a rough outline of an impact determination method according to the first embodiment.

FIG. 2 is a flowchart showing a rough outline of an impact determination method according to the first embodiment.

The impact determination method according to the present embodiment includes a first detection process (step S100) for detecting the presence or absence of an impact input based on the first output signal (the output signal in the X-axis direction) of the inertial sensor 100 having the plurality of detection axes, a second detection process (step S102) for detecting the presence or absence of an impact input based on the second output signal (the output signal in the Y-axis direction) different in detection axis from the first output signal of the inertial sensor 100, and an impact detection determination process (step S104), in which it is determined that the impact input has been made in the case in which the impact input has been detected in both of the first detection process (step S100) and the second detection process (step S102).

In the case of performing the method using the impact detection circuit 1 described above, it is also possible to arrange that the first detection section 10 performs the first detection process (step S100), the second detection section 20 performs the second detection process (step S102), and the impact detection determination section 40 performs the impact detection determination process (step S104).

Figure 3:
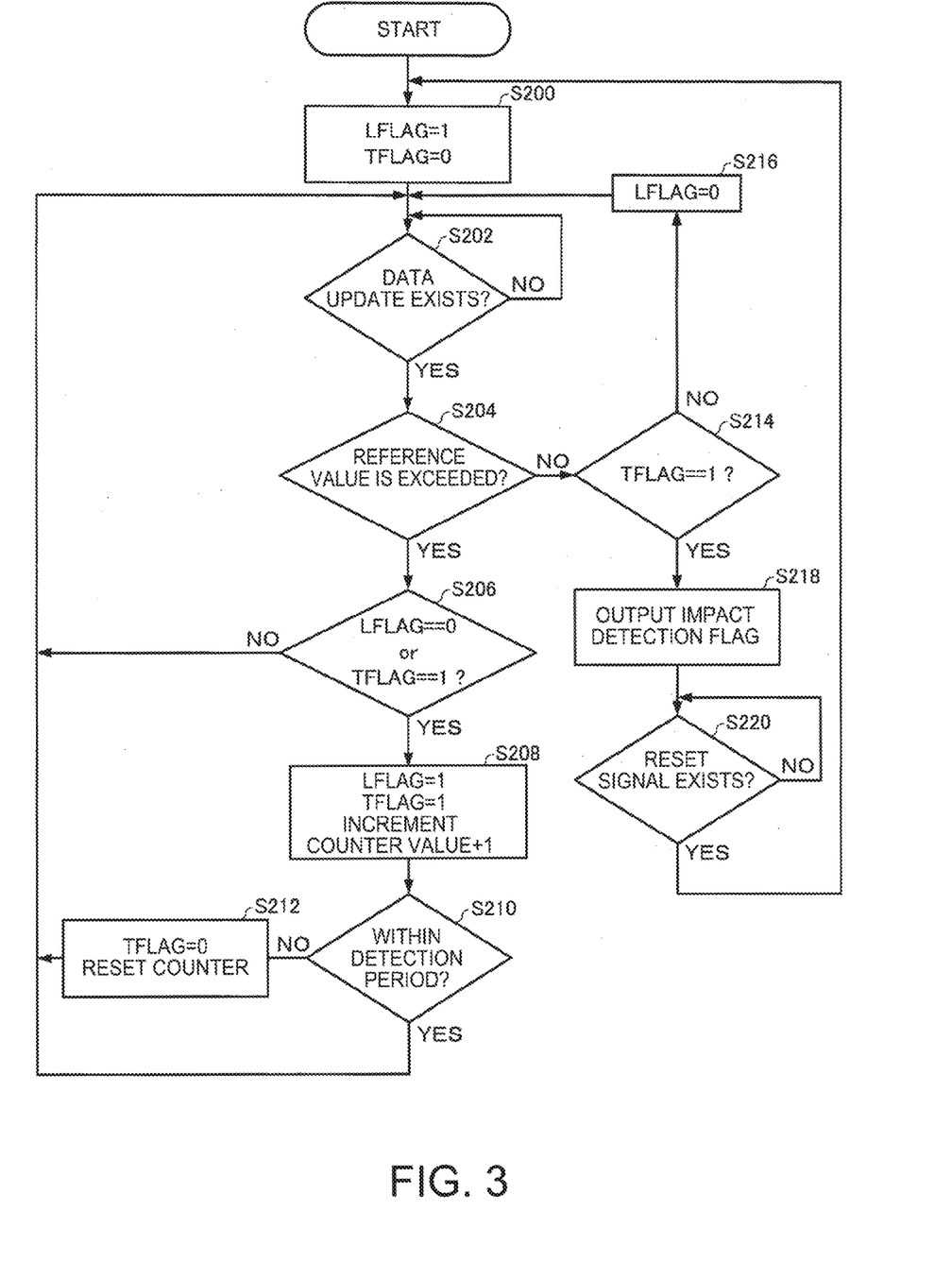
FIG. 3 is a flowchart showing an example of an action of an X-axis positive-direction impact detection section 11.

FIG. 3 is a flowchart showing an example of an action of the X-axis positive-direction impact detection section 11. In the example shown in FIG. 3, the X-axis positive-direction impact detection section 11 outputs the high level as an impact detection flag in the case in which the first output signal has exceeded the reference value and then fallen below the reference value in the positive direction of the detection axis (the X axis).

It should be noted that the actions of the X-axis negative-direction impact detection section 12, the Y-axis positive-direction impact detection section 21, the Y-axis negative-direction impact detection section 22, the Z-axis positive-direction impact detection section 31, and the Z-axis negative-direction impact detection section 32 are substantially the same as the action of the X-axis positive-direction impact detection section 11.

In FIG. 3, the X-axis positive-direction impact detection section 11 first substitutes 1 in the value of a flag LFLAG, and 0 in the value of a flag TFLAG (step S200). Subsequently to the step S200, the X-axis positive-direction impact detection section 11 determines (step S202) the presence or absence of an update of the data input to the X-axis positive-direction impact detection section 11. If no update of the data exists (in the case of NO in the step S202), the step S202 is repeated. If an update of the data exists (in the case of YES in the step S202), the X-axis positive-direction impact detection section 11 determines (step S204) whether or not the data exceeds the reference value.

In the case in which the data exceeds the reference value (in the case of YES in the step S204), the X-axis positive-direction impact detection section 11 determines (step S206) whether or not the condition of "the value of the flag LFLAG is 0, or the value of the flag TFLAG is 1" is fulfilled. If the condition is not fulfilled (in the case of NO in the step S206), the process returns to the step S202. This is because in the case in which the data has already exceeded the reference value at the start of the process, the presence of an impact input is not detected until the data falls below the reference value.

If the condition is fulfilled (in the case of YES in the step S206), the X-axis positive-direction impact detection section 11 substitutes 1 in the value of the flag LFLAG, substitutes 1 in the value of the flag TFLAG, and adds 1 to the value (the initial value is 0) of a counter (step S208).

Subsequently to the step S208, the X-axis positive-direction impact detection section 11 determines (step S210) whether or not it is in the detection period based on the value of the counter. If it is in the detection period (in the case of YES in the step S210), the process returns to the step S202. If it is not in the detection period (in the case of NO in the step S210), the X-axis positive-direction impact detection section 11 substitutes 0 in the value of the flag TFLAG, and then resets the counter (step S212). Subsequently to the step S212, the process returns to the step S202.

If the data does not exceed the reference value in the step S204 (in the case of NO in the step S204), the X-axis positive-direction impact detection section 11 determines (step S214) whether or not the value of the flag TFLAG is 1. If the value of the flag TFLAG is not 1 (the value of the flag TFLAG is 0) (in the case of NO in the step S214), the X-axis positive-direction impact detection section 11 substitutes (step S216) 0 in the value of the flag LFLAG. Subsequently to the step S216, the process returns to the step S202.

If the value of the flag TFLAG is 1 (in the case of YES in the step S214), the X-axis positive-direction impact detection section 11 outputs (step S218) an impact detection flag. Subsequently to the step S218, the X-axis positive-direction impact detection section 11 determines (step S220) the presence or absence of the reset signal. If the reset signal is absent (in the case of NO in the step S220), the step S220 is repeated, and the X-axis positive-direction impact detection section 11 continues to output the impact detection flag. If the reset signal is present (in the case of YES in the step S220), the process returns to the step S200.

Figure 4:
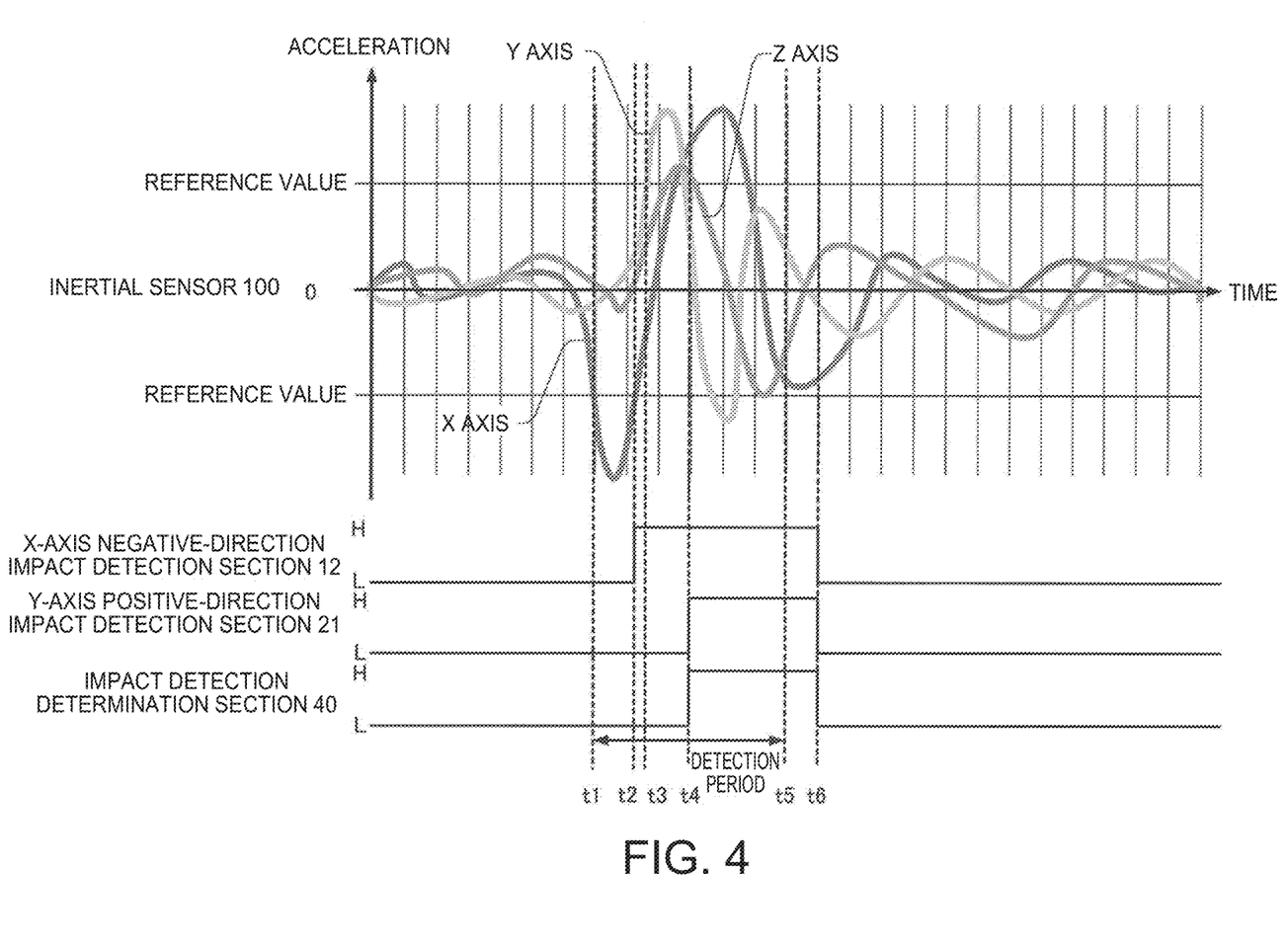
FIG. 4 is a timing chart showing an example of output signals of an inertial sensor 100, an X-axis negative-direction impact detection section 12, a Y-axis positive-direction impact detection section 21, and an impact detection determination section 40.

FIG. 4 is a timing chart showing an example of the output signals of the inertial sensor 100, the X-axis negative-direction impact detection section 12, the Y-axis positive-direction impact detection section 21, and the impact detection determination section 40.

In the example shown in FIG. 4, the output signal in the X axis of the inertial sensor 100 exceeds the reference value in the negative direction at the time point t1.

In the example shown in FIG. 4, in the case in which both of the first detection section 10 (the X-axis negative-direction impact detection section 12 in the example shown in FIG. 4) and the second detection section 20 (the Y-axis positive-direction impact detection section 21 in the example shown in FIG. 4) have detected the presence of an impact input within the detection period from the time point t1 to the time point t5, the impact detection determination section 40 determines that the impact input has been made.

In the example shown in FIG. 4, the output signal in the X axis of the inertial sensor 100 falls below the reference value in the negative direction at the time point t2. Therefore, the X-axis negative-direction impact detection section 12 detects the presence of the impact input, and then outputs the impact detection flag (in the high level) at and after the time point t2.

In the example shown in FIG. 4, the output signal in the Y axis of the inertial sensor 100 exceeds the reference value in the positive direction at the time point t3. Further, the output signal in the Y axis of the inertial sensor 100 falls below the reference value in the positive direction at the time point t4. Therefore, the Y-axis positive-direction impact detection section 21 detects the presence of the impact input, and then outputs the impact detection flag (in the high level) at and after the time point t4.

In the example shown in FIG. 4, since both of the first detection section 10 (the X-axis negative-direction impact detection section 12 in the example shown in FIG. 4) and the second detection section 20 (the Y-axis positive-direction impact detection section 21 in the example shown in FIG. 4) have detected the presence of the impact input within the detection period from the time point t1 to the time point t5, the impact detection determination section 40 outputs the impact determination flag (in the high level) at and after the time point t4.

It is extremely unusual for the impact input to appear only in the output of one detection axis, and the impact input usually appears in the outputs of two or more detection axes. According to the impact detection method related to the present embodiment, since it is determined that an impact input has been made in the case in which the impact input has been detected in both of the first detection process (step S100) and the second detection process (step S202), it is possible to reduce the false detection due to an input of an impact only in one detection axis. Therefore, it is possible to realize the impact detection method capable of improving the accuracy of the detection of an impact in two or more axes.

2. Second Embodiment

Figure 5:
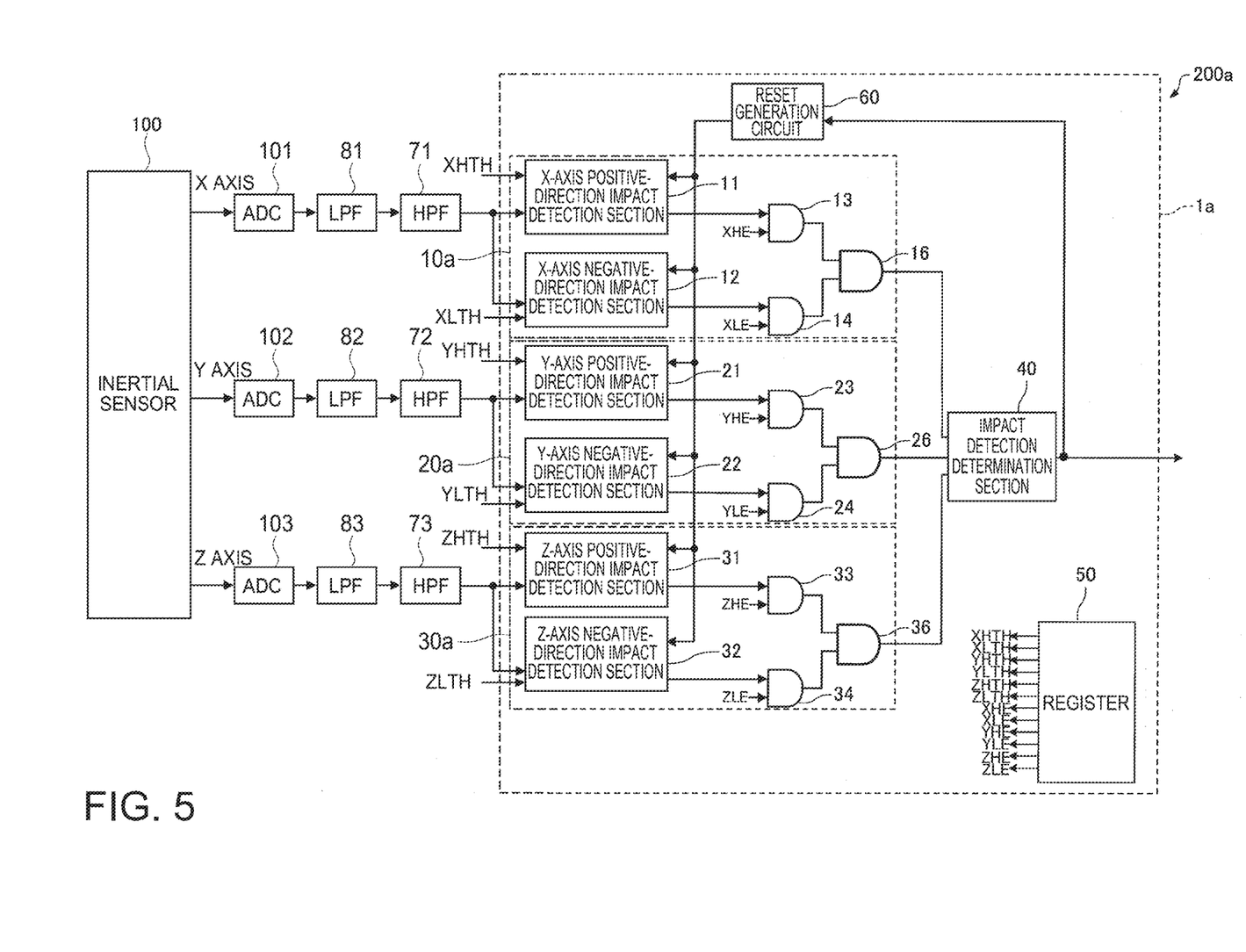
FIG. 5 is a circuit diagram showing a configuration of a physical quantity detection device 200a according to a second embodiment of the invention.

FIG. 5 is a circuit diagram showing a configuration of a physical quantity detection device 200a according to a second embodiment of the invention. The constituents similar to those of the physical quantity detection device 200 according to the first embodiment shown in FIG. 1 are denoted with the same reference symbols, and detailed explanation thereof will be omitted.

The physical quantity detection device 200a according to the second embodiment is different from the physical quantity detection device 200 according to the first embodiment in the point that there is adopted the configuration including an impact detection circuit 1a instead of the impact detection circuit 1.

The impact detection circuit 1a has a first detection section 10a, a second detection section 20a, and a third detection section 30a. Each of the first detection section 10a, the second detection section 20a, and the third detection section 30a detects the presence of an impact input in the case in which the first output signal, the second output signal, or the third output signal has exceeded the reference value and then fallen below the reference value in both of the positive direction and the negative direction of the detection axis.

In the example shown in FIG. 5, the impact detection circuit 1a is different from the impact detection circuit 1 in the point that there is adopted the configuration including an AND circuit 16 instead of the OR circuit 15, an AND circuit 26 instead of the OR circuit 25, and an AND circuit 36 instead of the OR circuit 35.

In the input of an impact, it is usual for the first output signal, the second output signal, or the third output signal to exceed the reference value in both of the positive direction and the negative direction of the detection axis. Therefore, according to the present embodiment, the accuracy of the detection of the impact in two or more axes can be improved.

Further, also in the physical quantity detection device 200a and the impact detection circuit 1a according to the second embodiment, substantially the same advantage can be obtained on substantially the same grounds as in the physical quantity detection device 200 and the impact detection circuit 1 according to the first embodiment.

3. Electronic Apparatus

Figure 6:
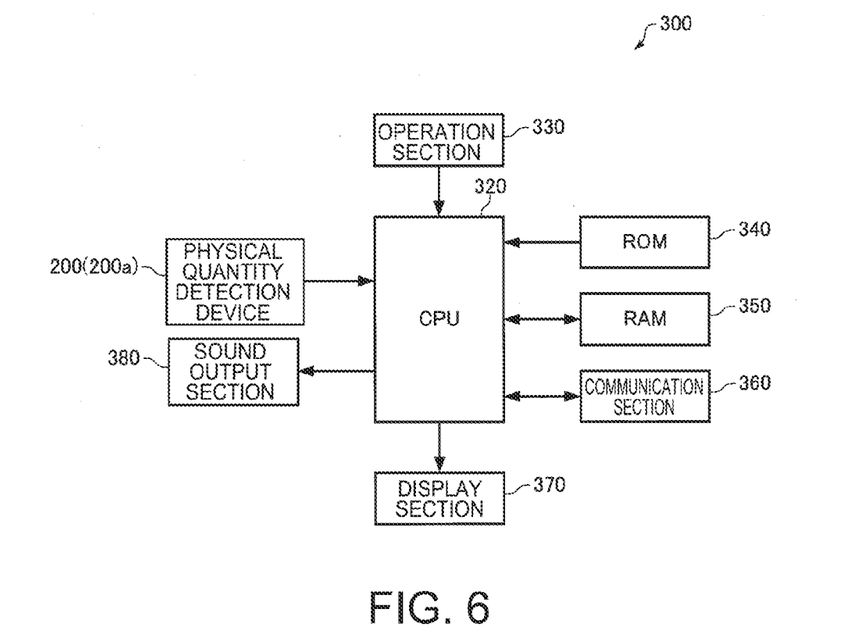
FIG. 6 is a functional block diagram of an electronic apparatus 300 according to the embodiment.

FIG. 6 is a functional block diagram of an electronic apparatus 300 according to the present embodiment. It should be noted that the constituents substantially the same as those of the embodiments described above are denoted with the same reference symbols, and the detailed description thereof will be omitted.

The electronic apparatus 300 according to the present embodiment is an electronic apparatus including the impact detection circuit 1 or the impact detection circuit 1a. In the example shown in FIG. 6, the electronic apparatus 300 is configured including the physical quantity detection device 200 configured including the impact detection circuit 1, a central processing unit (CPU) 320, an operation section 330, a read only memory (ROM) 340, a random access memory (RAM) 350, a communication section 360, a display section 370, and a sound output section 380. It should be noted that the electronic apparatus 300 according to the present embodiment can also have a configuration obtained by eliminating or modifying some of the constituents (the sections) shown in FIG. 6, or adding another constituent.

The CPU 320 performs a variety of calculation processes and control processes in accordance with programs stored in the ROM 340 and so on. Specifically, the CPU 320 performs a variety of processes corresponding to the output signal of the physical quantity detection device 200 and the operation signal from the operation section 330, a process of controlling the communication section 360 for performing data communication with external devices, a process of transmitting a display signal for making the display section 370 display a variety of types of information, a process of making the sound output section 380 output a variety of sounds, and so on.

The operation section 330 is an input device including operation keys, button switches, and so on, and outputs the operation signal corresponding to the operation by the user to the CPU 320.

The ROM 340 stores programs, data, and so on for the CPU 320 to perform a variety of arithmetic processes and control processes.

The RAM 350 is used as a working area of the CPU 320, and temporarily stores, for example, the program and data retrieved from the ROM 340, the data input from the operation section 330, and the calculation result obtained by the CPU 320 performing operations in accordance with the various programs.

The communication section 360 performs a variety of control processes for achieving the data communication between the CPU 320 and the external devices.

The display section 370 is a display device formed of a liquid crystal display (LCD), an electrophoretic display, or the like, and displays a variety of types of information based on the display signal input from the CPU 320.

Further, the sound output section 380 is a device, such as a speaker, for outputting sounds.

According to the electronic apparatus 300 related to the present embodiment, since there is included the impact detection circuit 1 capable of improving the accuracy of the impact detection, it is possible to realize the electronic apparatus 300 suitable for the detection of an impact input or the operation using an impact input. It should be noted that even in the case in which the electronic apparatus 300 is configured including the physical quantity detection device 200a, which is configured including the impact detection circuit 1a, instead of the physical quantity detection device 200, substantially the same advantage can be obtained.

As the electronic apparatus 300, a variety of types of electronic apparatus can be adopted. There can be cited, for example, a personal computer (e.g., a mobile type personal computer, a laptop personal computer, and a tablet personal computer), a mobile terminal such as a cellular phone, a digital still camera, an inkjet ejection device (e.g., an inkjet printer), a storage area network apparatus such as a router or a switch, a local area network apparatus, a mobile communication base station apparatus, a television set, a video camera, a video recorder, a car navigation system, a pager, a personal digital assistance (including one having a communication function), an electronic dictionary, an electronic calculator, an electronic game machine, a gaming controller, a word processor, a workstation, a picture phone, a security television monitor, an electronic binoculars, a POS (point-of-sale) terminal, a medical instrument (e.g., an electronic thermometer, a blood pressure monitor, a blood glucose monitor, an electrocardiograph, ultrasonic diagnostic equipment, and an electronic endoscope), a fish finder, a variety of measuring instruments, gauges (e.g., gauges for cars, aircrafts, and boats and ships), a flight simulator, a head-mount display, a motion tracer, a motion tracker, a motion controller, and a pedestrian dead reckoning (PDR) system.

Figure 7:
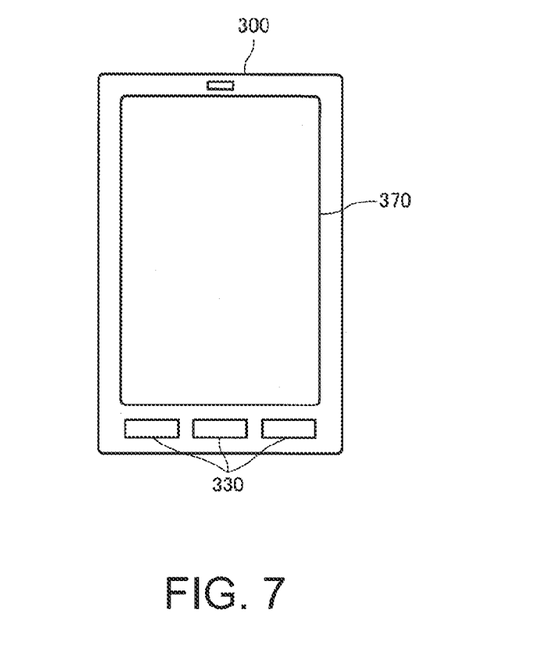
FIG. 7 is a diagram showing an example of an exterior appearance of a smartphone as an example of the electronic apparatus 300.

FIG. 7 is a diagram showing an example of an exterior appearance of a smartphone as an example of the electronic apparatus 300. The smartphone as the electronic apparatus 300 is provided with buttons as the operation sections 330, and an LCD as the display section 370. Further, since the smartphone as the electronic apparatus 300 includes the physical quantity detection device 200 configured including the impact detection circuit 1, the electronic apparatus 300 suitable for the detection of an impact input or the operation using an impact input can be realized.

4. Moving Object

Figure 8:
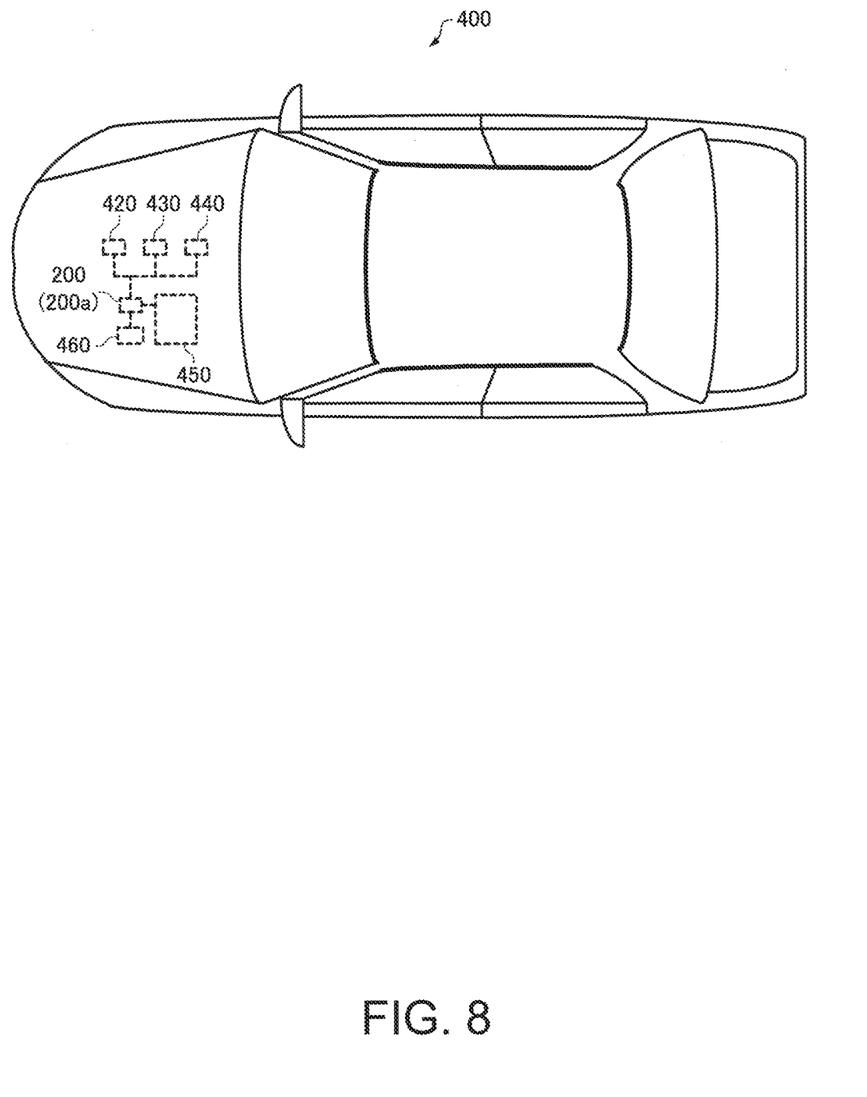
FIG. 8 is a diagram (a top view) showing an example of a moving object 400 according to the embodiment.

FIG. 8 is a diagram (a top view) showing an example of a moving object 400 according to the present embodiment. It should be noted that the constituents substantially the same as those of the embodiments described above are denoted with the same reference symbols, and the detailed description thereof will be omitted.

The moving object 400 according to the present embodiment is the moving object 400 including the impact detection circuit 1 or the impact detection circuit 1a. FIG. 8 shows the moving object 400 configured including the physical quantity detection device 200 configured including the impact detection circuit 1. Further, in the example shown in FIG. 8, the moving object 400 is configured including controllers 420, 430, and 440 for performing control of a variety of systems such as an engine system, a brake system, or a keyless entry system, a battery 450, and a backup battery 460. It should be noted that the moving object 400 according to the present embodiment can also have a configuration obtained by eliminating or modifying some of the constituents (the sections) shown in FIG. 8, or adding another constituent.

According to the moving object 400 related to the present embodiment, since there is included the impact detection circuit 1 capable of improving the accuracy of the impact detection, it is possible to realize the moving object 400 suitable for the detection of an impact input or the operation using an impact input. It should be noted that even in the case in which the moving object 400 is configured including the physical quantity detection device 200a, which is configured including the impact detection circuit 1a, instead of the physical quantity detection device 200, substantially the same advantage can be obtained.

As such a moving object 400, a variety of types of moving objects can be adopted, and a vehicle (including an electric vehicle), an aircraft such a jet plane or a helicopter, a ship, a rocket, an artificial satellite, and so on can be cited.

Although the embodiments and the modified examples are explained hereinabove, the invention is not limited to the embodiments and the modified examples described above, but can be put into practice in various forms within the scope or the spirit of the invention.

The invention includes configurations (e.g., configurations having the same function, the same way, and the same result, or configurations having the same object and the same advantages) substantially the same as those explained in the description of the embodiments. Further, the invention includes configurations obtained by replacing a non-essential part of the configuration explained in the above description of the embodiments. Further, the invention includes configurations providing the same functions and the same advantage, or configurations capable of achieving the same object, as the configuration explained in the description of the embodiments. Further, the invention includes configurations obtained by adding a known technology to the configuration explained in the description of the embodiments.

The entire disclosure of Japanese Patent Application No. 2014-056359, filed Mar. 19, 2014 is expressly incorporated by reference herein.

What is claimed is:

1. An impact detection circuit comprising:
   a first detection section adapted to detect presence or absence of an impact input based on a first output signal as an output signal in a first detection axis of an inertial sensor having the first detection axis and a second detection axis different from each other;
   a second detection section adapted to detect presence or absence of an impact input based on a second output signal as an output signal in the second detection axis; and
   an impact detection determination section adapted to determine that an impact input has been made in a case in which both of the first detection section and the second detection section have detected the presence of the impact input, wherein
   the first detection section detects the presence of the impact input in a case in which the first output signal has exceeded a first reference value and then falls below the first reference value in at least one of a positive direction or a negative direction of the first detection axis, and
   the second detection section detects the presence of the impact input in a case in which the second output signal has exceeded a second reference value and then falls below the second reference value in at least one of a positive direction or a negative direction of the second detection axis.

2. The impact detection circuit according to claim 1 further comprises:
   a register setting the first reference value and the second reference value independently of each other.

3. A physical quantity detection device comprising:
   the impact detection circuit according to claim 2; and
   the inertial sensor.

4. An electronic apparatus comprising:
   a central processing unit; and
   a physical quantity detection device including the inertial sensor and the impact detection circuit according to claim 2, wherein the physical quantity detection device outputs information regarding a detected impact to the central processing unit.

5. A moving object comprising:
the inertial sensor; and
the impact detection circuit according to claim 2.

6. The impact detection circuit according to claim 1, wherein
the first detection section detects the presence of the impact input in a case in which the first output signal has exceeded the first reference value and then falls below the first reference value in both of the positive direction and the negative direction of the first detection axis, and
the second detection section detects the presence of the impact input in a case in which the second output signal has exceeded the second reference value and then falls below the second reference value in both of the positive direction and the negative direction of the second detection axis.

7. The impact detection circuit according to claim 6 further comprising:
a register setting the first reference value and the second reference value independently of each other.

8. A physical quantity detection device comprising:
the impact detection circuit according to claim 6; and
the inertial sensor.

9. An electronic apparatus comprising:
a central processing unit; and
a physical quantity detection device including the inertial sensor and the impact detection circuit according to claim 6, wherein the physical quantity detection device outputs information regarding a detected impact to the central processing unit.

10. The impact detection circuit according to claim 1, wherein
the impact detection determination section determines that the impact input has been made in a case in which both of the first detection section and the second detection section have detected the presence of the impact input within a detection period.

11. The impact detection circuit according to claim 10, wherein
the detection period starts at a timing at which one of the first output signal or the second output signal has exceeded the respective reference values.

12. The impact detection circuit according to claim 1, wherein
the first detection section receives the first output signal from a first high-pass filter that is configured to execute a high-pass filter processing; and
the second detection section receives the second output signal from a second high-pass filter that is configured to execute the high-pass filter processing.

13. A physical quantity detection device comprising:
the impact detection circuit according to claim 1; and
the inertial sensor.

14. An electronic apparatus comprising:
a central processing unit; and
a physical quantity detection device including the inertial sensor and the impact detection circuit according to claim 1, wherein the physical quantity detection device outputs information regarding a detected impact to the central processing unit.

15. A moving object comprising:
the inertial sensor; and
the impact detection circuit according to claim 1.

16. An impact detection method comprising:
a first detection step of detecting presence or absence of an impact input based on a first output signal of an inertial sensor, wherein the inertial sensor detects acceleration along a plurality of detection axes and the first output signal is indicative of an acceleration along a first detection axis from among the plurality of detection axes;
a second detection step of detecting presence or absence of an impact input based on a second output signal different from the first output signal of the inertial sensor, wherein the second output signal is indicative of an acceleration along a second detection axis from among the plurality of detection axes; and
an impact detection determination step of determining that an impact input has been made in a case in which the presence of the impact input has been detected in both of the first and second detection steps, wherein
the first detection step includes detecting the presence of the impact input in a case in which the first output signal has exceeded a first reference value and then falls below the first reference value in at least one of a positive direction or a negative direction of the first detection axis, and
the second detection step includes detecting the presence of the impact input in a case in which the second output signal has exceeded a second reference value and then falls below the second reference value in at least one of a positive direction or a negative direction of the second detection axis.

* * * * *